United States Patent
Paik et al.

(10) Patent No.: US 8,078,154 B2
(45) Date of Patent: *Dec. 13, 2011

(54) CALLER INFORMATION PROVIDING APPARATUS AND TRANSMITTING METHOD IN MOBILE COMMUNICATION NETWORK

(75) Inventors: Woo Hyun Paik, Seoul (KR); Young Man Park, Kyonggi-do (KR); Seung Kwon Ahn, Seoul (KR)

(73) Assignee: LG Electronics Inc., Seoul (KR)

( * ) Notice: Subject to any disclaimer, the term of this patent is extended or adjusted under 35 U.S.C. 154(b) by 901 days.

This patent is subject to a terminal disclaimer.

(21) Appl. No.: 12/041,885

(22) Filed: Mar. 4, 2008

(65) Prior Publication Data

US 2008/0153471 A1    Jun. 26, 2008

Related U.S. Application Data

(63) Continuation of application No. 11/600,828, filed on Nov. 17, 2006, now Pat. No. 7,536,178, which is a continuation of application No. 10/735,884, filed on Dec. 16, 2003, now Pat. No. 7,149,505, which is a continuation of application No. 09/615,602, filed on Jul. 13, 2000, now Pat. No. 6,675,008.

(30) Foreign Application Priority Data

Jul. 15, 1999 (KR) .................................. 1999-28724

(51) Int. Cl.
*H04M 3/42* (2006.01)
*H04K 3/00* (2006.01)

(52) U.S. Cl. .................. 455/415; 348/14.02; 379/93.23

(58) Field of Classification Search .................. 455/415, 455/416, 435.1, 566, 567; 379/93.23, 142.06, 379/142.17; 348/14.02, 14.1
See application file for complete search history.

(56) References Cited

U.S. PATENT DOCUMENTS

| | | | |
|---|---|---|---|
| 5,073,927 A | 12/1991 | Grube | |
| H1714 H | 3/1998 | Partridge, III | |
| 5,761,279 A | 6/1998 | Bierman et al. | |
| 5,889,852 A | 3/1999 | Rosecrans et al. | |
| 6,018,668 A | 1/2000 | Schmidt | |
| 6,317,609 B1 | 11/2001 | Alperovich et al. | |
| 6,611,684 B1* | 8/2003 | Franks | 455/433 |
| 6,675,008 B1 | 1/2004 | Paik et al. | |
| 7,257,210 B1* | 8/2007 | Henderson | 379/142.04 |
| 2003/0022659 A1 | 1/2003 | Mun et al. | |

FOREIGN PATENT DOCUMENTS

| | | |
|---|---|---|
| JP | 8-331233 | 12/1996 |
| JP | 10-178679 | 6/1998 |
| JP | 11-032115 | 2/1999 |
| JP | 11-68957 | 3/1999 |
| JP | 11-136653 | 5/1999 |
| KR | 10-2000-0033525 | 6/2000 |
| WO | WO99/18577 | 4/1999 |

OTHER PUBLICATIONS

Korean Office Action dated Dec. 30, 2008.
Japanese Office Action dated Dec. 1, 2009.
European Office Action dated May 26, 2008.

\* cited by examiner

*Primary Examiner* — Lee Nguyen
(74) *Attorney, Agent, or Firm* — KED & Associates LLP

(57) ABSTRACT

A caller information providing system and caller information transmitting method in a mobile radio communication network is disclosed. When a call comes in, the present invention provides a user at the terminating mobile station a picture information of a caller or caller information including a picture information, audio information, and/or character information of the caller.

33 Claims, 6 Drawing Sheets

CALLER INFORMATION PROVIDING APPARATUS AND TRANSMITTING METHOD IN MOBILE COMMUNICATION NETWORK

This application is a Continuation of prior application Ser. No. 11/600,828, filed Nov. 17, 2006 now U.S. Pat. No. 7,536,178, which is a Continuation of prior application Ser. No. 10/735,884, filed Dec. 16, 2003, now U.S. Pat. No. 7,149,505, which in turn is a Continuation of application Ser. No. 09/615,602 filed on Jul. 13, 2000, now U.S. Pat. No. 6,675,008, the entire contents of which are herein incorporated by reference.

BACKGROUND OF THE INVENTION

1. Field of the Invention

The present invention relates to a mobile radio communication network and more particularly, to a caller information providing apparatus and a caller information transmitting method in a mobile radio communication network. In particular, the present invention relates to a caller information providing apparatus and a caller information transmitting method in a mobile radio communication network which transmits the caller information simultaneously when a telephone call is transmitted to a mobile terminal.

2. Description of the Related Art

A user at a terminal of a receiver mobile station belonging to a telephone communication network sometimes wishes to know who is calling before receiving the call. To meet such demand, a caller line identification (CLID) service has been commercialized to provide the telephone number and name of callers through a display installed in the receiver mobile station terminal when a call comes in from an originating mobile terminal of a fixed network such as a public switching network (PSTN). However, the CLID service has been provided only in fixed networks based on the public switching network, and could not be provided in a mobile radio communication network due to technical problems.

SUMMARY OF THE INVENTION

Accordingly, an object of the present invention is to solve at least the problems and disadvantages of the related art.

An object of the present invention is to provide a caller information providing apparatus and a caller information transmitting method in a mobile radio communication network.

Another object of the present invention is to provide a caller information providing apparatus and transmitting method which can transmit picture information of a caller when transmitting a call to a mobile terminal in the mobile radio communication network.

A further object of the present invention is to provide a caller information providing apparatus and transmitting method in a mobile radio communication network which enables an operating center of a communication service provider or terminal subscription agency to prepare, register, and manage a picture of mobile terminal users, so that the picture can be transmitted to mobile terminals if required.

A still further object of the present invention is to provide a caller information providing apparatus and transmitting method in a mobile radio communication network which can transmit caller information wherein picture information, audio information, and character information of callers are selectively combined when a call is transmitted to a mobile terminal in a caller information system.

A still further object of the present invention to provide a mobile terminal which can receive caller information wherein picture information, audio information, and character information of the caller are selectively combined when a mobile terminal receives a call in a caller information system.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

To achieve the objects and in accordance with the purposes of the invention, as embodied and broadly described herein, a caller information providing apparatus in a mobile radio communication network comprises a receiver mobile terminal with a display device for displaying picture information; a base station for processing originating and terminating call signals of mobile terminals and providing a radio channel for transmitting picture information to a receiver mobile terminal; a mobile switching center for processing the originating and terminating call signals from the base station and transmitting the picture information to the receiver mobile terminal; a picture service controller for storing the picture information and providing the picture information to the mobile switching center; and a communication service provider operating center for registering users and performing a picture information service control.

According to the present invention, the picture information represents a user characteristic. The picture information may be information which a user desires to transmit. The picture information may also be information which is registered by users in the picture service controller through the communication service provider operating center. Here, a user may register the picture information using a picture recognition device or a camera. The user generates the picture information using an input device and registers the generated picture information. Finally, the picture information may be information provided by the communication service provider operating center.

The picture service controller comprises a data transmitting/receiving unit for performing data communication with the communication service provider operating center or the mobile switching center; an originating identifier detecting unit for detecting an identifier of a specified mobile terminal from an output signal of the data transmitting/receiving unit; a control unit for controlling storage of the picture signal provided from the data transmitting/receiving unit and outputting the stored picture information; and a caller information generating unit for providing the picture information to the data transmitting/receiving unit under the control of the control unit.

The picture service controller further comprises an identifier managing unit for managing the identifier of the respective mobile terminal in the form of a database under the control of the control unit, and a picture memory for storing the picture information or outputting the stored picture information under the control of the control unit.

Particularly, the picture memory may store the picture information which is classified for each caller under the control of the control unit. The picture memory may also store the picture information which is classified for each user registered in the communication service provider operating center under the control of the control unit.

In another embodiment of the present invention, a caller information providing apparatus in a mobile radio communication network comprises a mobile terminal with a display device for displaying picture information and/or character information and a speaker for outputting audio information; a base station for processing originating and terminating call signals of the mobile terminal and providing a radio channel for enabling selective transmission of picture information, character information, or audio information to the mobile terminal; a mobile switching center for processing originating and terminating call signals output from the base station and transmitting to a mobile terminal caller information wherein the picture information, the audio information, and the character information are selectively combined; a picture service controller for storing caller information and providing the caller information to the mobile switching center; and a communication service provider operating center for registering users and performing a caller information service control.

The caller information is information which represents a caller characteristic, and is composed of a combination of at lease one of the picture information, the character information, and the audio information.

A picture information transmitting method in a mobile radio communication network according to the present invention comprises requesting from a mobile switching center to a picture service controller a search and transmission of a picture information if a mobile terminal among a plurality of mobile terminals requests a call connection to an terminating mobile terminal; transmitting from the picture service controller the information corresponding to a search request to the mobile switching center; and transmitting from the mobile switching center the picture information to the terminating mobile terminal along with a paging signal of the mobile terminal.

The method according to the present invention may further comprise selecting by a mobile terminal user whether to execute the picture information transmitting method.

In another embodiment of the present invention, a picture information transmitting method in a mobile radio communication network comprises generating a picture information of a specified user, registering the picture information in a picture service controller, and transmitting the registered picture information to a specified mobile terminal.

Here, the picture information may be generated using a picture recognition device or a camera. The picture information may also be generated using other input devices. Moreover, the generated picture information may be registered along with a corresponding mobile terminal identifier.

In still another embodiment of the present invention, a mobile terminal comprises a caller identifier detecting unit for receiving caller information transmitted through a radio channel and separating the caller information into picture information, character information, and audio information; a signal processing unit for processing the information separated by the caller identifier detecting unit; a control unit for controlling storage and output of the information output from the signal processing unit; a memory for storing the information output from the signal processing unit under the control of the control unit; and a display unit for displaying the information output from the signal processing unit under the control of the control unit.

According to the present invention as described above, if a terminating mobile terminal receives a call signal in a mobile radio communication network, a caller information may be provided in a selective combination of the picture information, audio information, and character information. Thus, a user of the terminating mobile terminal can easily identify who the caller is before receiving a call. Also, a picture, i.e. a face of the opposite party, which can be seen during a call may be useful and convenient to the user. Finally, if a user pages his/her own mobile terminal, the user can enjoy the user's information such as the user's picture, characters, and voice through the mobile terminal.

BRIEF DESCRIPTION OF THE DRAWINGS

The invention will be described in detail with reference to the following drawings in which like reference numerals refer to like elements wherein.

DETAILED DESCRIPTION OF THE PREFERRED EMBODIMENTS

Reference will now be made in detail to the preferred embodiments of the present invention, examples of which are illustrated in the accompanying drawings.

Figure 1:
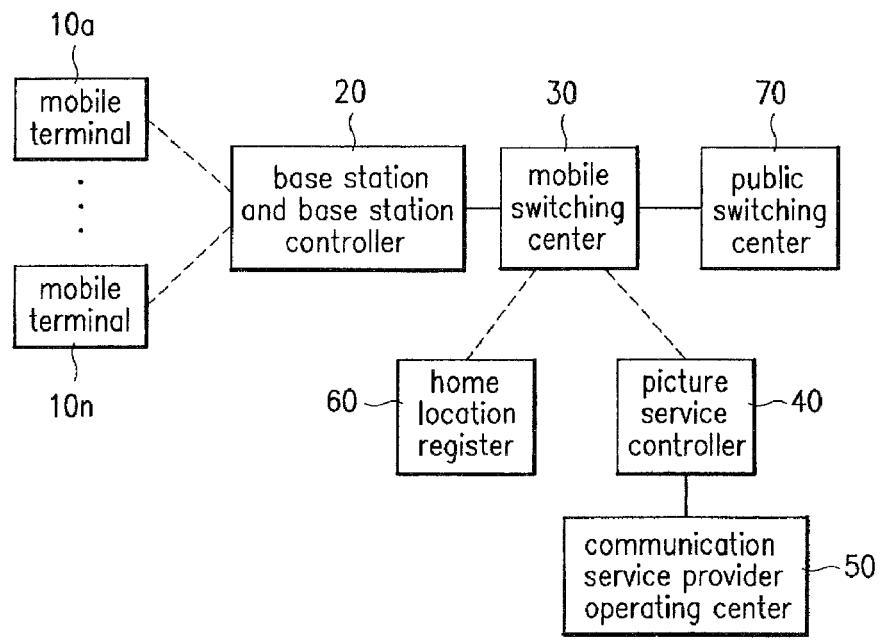
FIG. 1 is a block diagram of a code division multiple access (CDMA) type of mobile radio communication network according to the present invention.

FIG. 1 is a block diagram illustrating the construction of a CDMA type mobile radio communication network according to the present invention. Referring to FIG. 1, a caller information providing system of a mobile radio communication network according to the present invention includes a plurality of mobile terminals 10a~10n, each having a display device for displaying picture information; a base station and base station controller 20 which processes originating call signals and terminating call signals for the mobile terminals 10a~10n, and provides radio channels for enabling transmission of a picture information to respective mobile terminals; a mobile switching center 30 which processes the originating call signals from the base station and base station controller 20 and transmits picture information of a mobile terminal user to a terminating mobile terminal through a serving base station during the originating call signal processing; and a picture service controller 40 which transmits to the mobile switching center 30 the picture information corresponding to the originating mobile terminal under the control of the mobile switching center 30.

A home location register 60 is also connected to the mobile switching center 30 and manages locations of the mobile terminals 10a~10n; and a public switching network 70 is a general wired telephone network.

Each respective mobile terminal 10a~10n is provided with a display device for displaying a picture information and/or character information, and a speaker for outputting an audio information. Particularly, the picture service controller 40 is provided with a separate memory for separately storing picture information, character information, and audio information. Accordingly, when an originating mobile terminal transmits an originating telephone call, one or a combination of the picture information, the audio information, and the character information may selectively be provided as the caller information.

In the current CDMA cellular mobile radio communication network, 64 channels are allocated per each frequency. The 64 channels includes a pilot channel, a sync channel, and 7 paging channels while the remaining channels are traffic channels. Here, the paging channel transfers message information from the base station to mobile terminals. Important messages include a system information, paging, command, and channel allocation.

For purposes of explanation, the following functions of the mobile radio communication network will be defined according to the present invention.

In the mobile radio communication network, a serving base station may selectively transmit a paging signal as well as picture information, character information, or audio information using either one or two paging channel. If two paging channels are used, a main paging channel transmits the paging signal and/or audio information, and a predetermined secondary paging channel transmits the character information and/or picture information. At this time, if the picture information is transmitted through the secondary paging channel, the paging signal transmitted through the main paging channel includes a message informing that the picture information is transmitted through the secondary paging channel.

The picture information may also be transmitted with a traffic data to the terminating mobile terminal through a traffic channel provided in the mobile radio communication network. At this time, the picture information is preferably positioned in front of the traffic data.

Moreover, the present invention uses a picture compression technique for storing and transmitting the picture of a caller. Namely, the size of the picture may be fixed, for example to 64×64 bits, such that the resolution of the picture information would be maintained at a predetermined degree and such that the picture information would have a minimum amount of data during storage and transmission. Alternatively, the original picture information having a size of approximately 200× 200 bits may be prepared, compressed, and transmitted while a terminating mobile terminal may receive the compressed picture information and convert the size of the picture in conformity to the size of its own display device.

Figure 2:
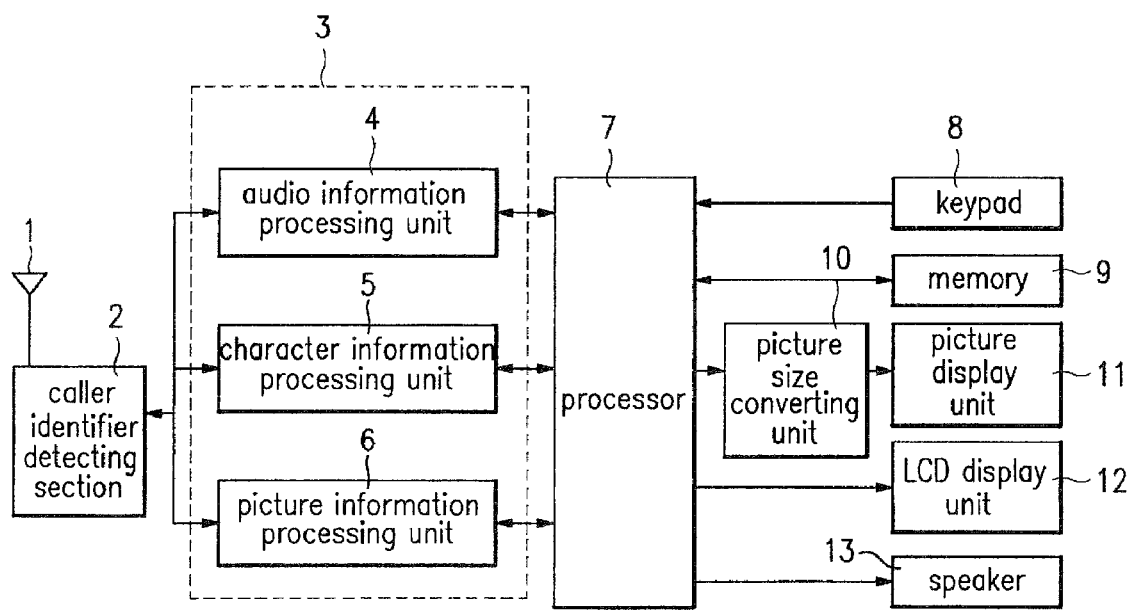
FIG. 2 is a block diagram of a mobile terminal according to the present invention.

As shown in FIG. 2, each mobile terminal 10a~10n according to the present invention includes a caller identifier detecting unit 2 which receives a data frame transmitted through one paging channel, detects the caller identifier, and receives the transmitted data if the terminating mobile terminal identifier included in the data frame indicates itself to output the received data according to the type of data; a signal processing unit 3 which respectively restores an output signal from the caller identifier detecting unit 2 to an original audio signal, character signal, or picture signal; a processor 7 which respectively controls storage and output of the audio signal, picture signal, or character signal from the signal processing unit 3; a picture size converting unit 10 which converts the picture signal or character signal from the processor 7 to a predetermined size; a keypad 8 which controls the processor 7; a memory 9 which stores information output from the processor 7; a picture display unit 11 which displays a picture information output from the picture size converting unit 10; an LCD display unit 12 which displays a character information output from the processor 7; and a speaker 13 which plays audio information output from the processor 7.

In the above mobile terminal, the signal processing unit 3 includes an audio information processing unit 4, a character information processing unit 5, and picture information processing unit 6 for respectively restoring the signal from the caller identifier detecting unit 2.

Figure 3:
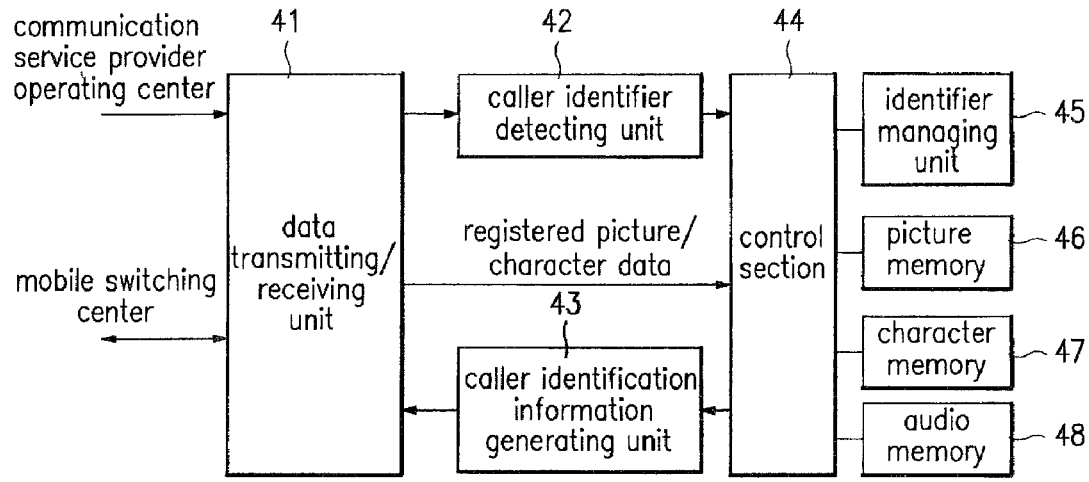
FIG. 3 is a block diagram of the picture service controller of FIG. 1.

Also, the picture service controller 40, as shown in FIG. 3, includes a data transmitting/receiving unit 41 which performs data communication with the communication service provider operating center 50 or the mobile switching center 30; a caller identifier detecting unit 42 which detects an identifier of an originating mobile terminal from an output signal of the data transmitting/receiving unit 41; a control unit 44 which controls storage of the caller identifier information of each mobile terminal provided from the data transmitting/receiving unit 41 or selectively outputs a stored caller identifier information; a caller identifier information generating unit 43 which receives the caller identifier information selectively output from the control unit 44 and provides the caller identifier information to the data transmitting/receiving unit 41 under the control of the control unit 44; and an identifier managing unit 45 which manages the identifier of the respective mobile terminal in the form of a database under the control of the control unit 44.

The picture service controller 40 further includes a picture memory 46 which stores the picture information or outputs a stored picture information under the control of the control unit 44; a character memory 47 which stores the character information or outputs a stored character information under the control of the control unit 44; and an audio memory 48 which stores the audio information or outputs a stored audio information under the control of the control unit 44.

The picture service controller 40 examines its own identifier managing unit 45 in accordance with a request from a mobile switching center 30, and if the current originating mobile terminal is a subscriber to which a caller identification service is to be provided, the picture service controller 40 provides to the mobile switching center a pre-requested information between each mobile terminal and the communication service provider operating center 50 through the communication service provider operating center 50.

Specifically, the pre-requested information may be a picture information for displaying the face of a user of the originating mobile terminal, or a character information for displaying information such the telephone number, name, and/or trade name of the originating mobile terminal. Also, the picture service controller 40 may simultaneously provide a character information with a picture information, or may simultaneously provide a picture information, character information, and audio information which plays the contents of the character information.

Figure 4:
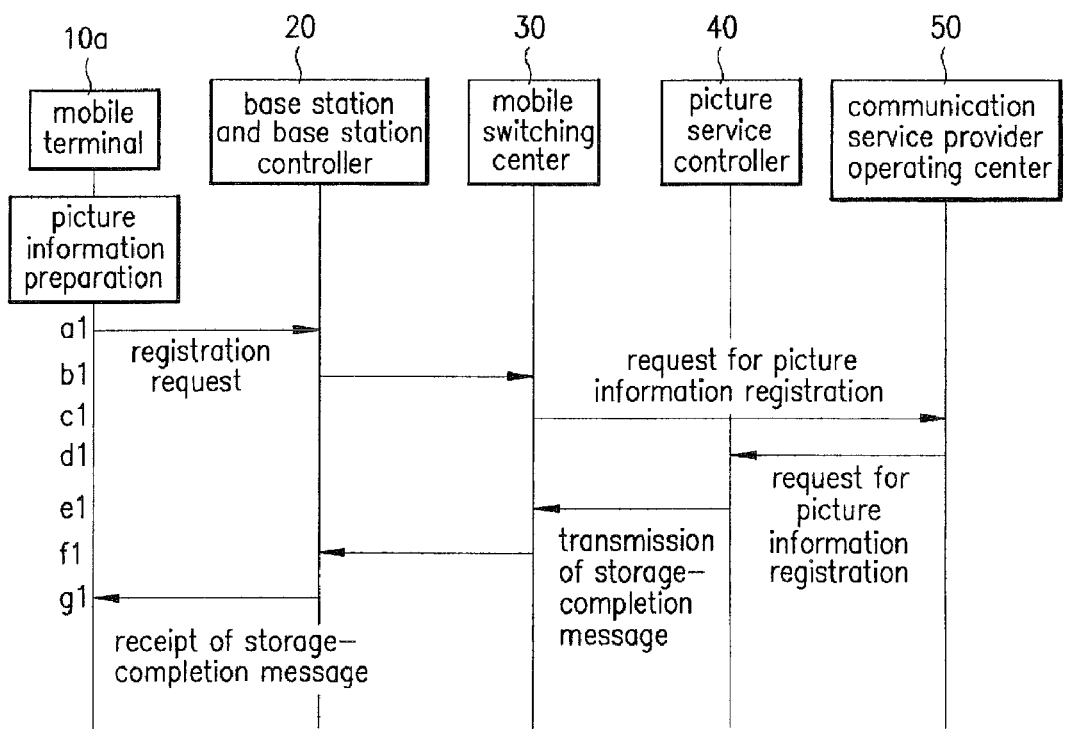
FIG. 4 is a flowchart of the picture information registering process in the CDMA mobile radio communication network according to the present invention.

FIG. 4 is a sequential flowchart illustrating the picture information registering process in the CDMA mobile radio communication network according to the present invention. First, the picture compression method used in the present invention will be explained.

Generally, a JPEG or JPEG-2000 has been proposed as the standard compression method of a still picture. The JPEG transforms a still picture into a 2-dimensional picture using a discrete cosine transform (DCT), and then quantizes the transformed picture to improve the compression efficiency. However, this transform has a drawback in that a transform processes in both forward and reverse directions must be performed. Therefore, there is a great possibility that the JPEG-2000 will be adopted as the standard method using a wavelet technique, but the JPEG-2000 has a greater amount of calculation in comparison to the JPEG. Particularly, the compression ratio of the JPEG is approximately 20~80:1 while the compression ratio of the JPEG-2000 is 100:1.

As compression techniques which can minimize the amount of calculation in a state in which the mobile terminal user can recognize a picture, a delta modulation (DM) having a compression ratio of about 4 to 1, a differential pulse coding modulation (DPCM) having a compression ratio of about 6 to 1, an adaptive pulse coding modulation (ADPCM) having a compression ratio of about 8 to 1 may be considered. In case of using these compression techniques, a robust process which is strong in correcting errors due to noise should also be considered.

Referring back to FIG. 4, a mobile terminal user prepares a picture information such as a photograph or a picture which represents the character of the user using an input device such as a computer or scanner; and transmits the picture information to the mobile switching center 30 through the base station 20 (steps a1 and b1). The mobile switching center 30 receives the picture information data, and transmits the received picture information data to the communication service provider operating center 50 for registration (step c1). The communication service provider operating center 50 then compresses the received picture information in conformity to the determined standard or converts the size of the picture information, and transmits the picture information to the picture service controller 40 to request for a registration of the picture information for a caller identification (step d1).

According to the present invention, the picture information may be transmitted after compressing the original picture of 64×64 bits, or after compressing the original picture of 200× 200 bits. If the original picture is transmitted after compressing the picture of 200×200 bits, the terminating mobile terminal converts the size of the picture in conformity to the size of its own display to display the converted picture on the display. A detailed explanation of this will follow later.

Upon receiving a request the picture information registration, the picture service controller 40 registers the picture information in the picture memory 46 and manages the picture information of the corresponding mobile terminal user according to the request of the communication service provider operating center 50. Thereafter, the picture service controller 40 transmits to the mobile switching center 30 a message informing a completion of the picture storage, and then the mobile switching center 30 transmits the same message to the originating mobile terminal through the base station 20 (steps e1 to g1).

In FIG. 4, a mobile terminal user may prepare a character information such as a name, trade name, or message which represents the character of the user using a computer or mobile terminal. In such case, the character information would be transmitted to the mobile switching center 30 through the base station 20 (steps a1 and b1). The mobile switching center 30 would receive the character information data, and transmit the received character information data to the communication service provider operating center 50 (step c1). The communication service provider operating center 50 would request to the picture service controller 40 a registration of the character information for caller identification (step d1).

The picture service controller 40 would register the character information in the character memory 47 and manage the character information of the mobile terminal user according to the request of the communication service provider operating center 50. Thereafter, the picture service controller 40 would transmit a message informing a completion of the character information storage to the mobile switching center 30, and the mobile switching center 30 would transmit the same message to the originating mobile terminal through the base station 20 (steps e1~g1).

Moreover, the mobile terminal user may prepare an audio information such as a song or accompaniment which represents the character of the user using a computer. Thus, the audio information would be transmitted to the mobile switching center 30 through the base station 20 (steps a1 and b1). The mobile switching center 30 would receive the audio information data, and transmit the received audio information data to the communication service provider operating center 50 (step c1). The communication service provider operating center 50 would request to the picture service controller 40 the registration of the audio information for the caller identification (d1).

The picture service controller 40 would then register the audio information in the audio memory 47 and manage the audio information of the mobile terminal user according to the request of the communication service provider operating center 50. Thereafter, the picture service controller 40 would transmit a message informing a completion of the audio information storage to the mobile switching center 30, and the mobile switching center 30 would transmit the same message to the originating mobile terminal through the base station 20 (steps e1~g1).

In the above registration process described with reference to FIG. 4, the communication service provider operating center 50 or terminal subscription agency (not illustrated) may prepare the pictures of respective mobile terminal users using a picture recognition device such as a scanner or a digital camera. The prepared picture information is converted into a predetermined standard size, compressed, and then transmitted to the picture service controller 40 for registration. A character information or audio information which represents the character of respective mobile users can also be prepared by the communication service provider operating center 50 or terminal subscription agency and be registered in the same manner as described above.

Accordingly, if the mobile switching center 30 requests for information of the caller, the picture service controller 40 determines if a picture information, a character information, and audio information corresponding to the originating mobile terminal exists using the registered information for caller identification. Thereafter, the mobile switching center 30 selectively combines and transmits the caller information determined between the originating mobile terminal and the communication service provider operating center 50.

In the present invention, the picture information may include a photograph of a user of the originating mobile terminal registered in the picture service controller 40, an image or character representing the characteristic of the user, or a still picture or moving picture drawn by the user. The character information may include the telephone number of the originating mobile terminal, name, trade name, or message prepared by the originating mobile terminal user and registered in the picture service controller 40. The audio information may include a known song or accompaniment, melody, or audio message prepared by the originating mobile terminal user, and registered in the picture service controller 40.

The picture information, character information and the audio information can be prepared by a user using an input device, and register the information in the picture service controller 40. The input device may be a wired/wireless remote control, a keyboard, a mouse, or pen mouse connected by wire or wirelessly to the computer.

Also, an originating mobile terminal user may select, register in the picture service controller 40, and transmit a picture information provided by the communication service provider operating center 50. Similarly, an originating mobile terminal user may select, register in the picture service controller 40, and transmit a character information and/or audio information provided from the communication service provider operating center 50.

Such picture information as described above may be transmitted by itself or in combination with one or both of the character information and the audio information. Likewise, the character information may be transmitted by itself or in combination with one or both of the picture information and the audio information. Finally, the audio information may be transmitted by itself or in combination with one or both of the picture information and the character information.

The picture information, character information, and audio information as described above can be changed and/or expanded within the conditions supported by the communication system. Also, the picture information, character information, and the audio information may be sorted according to each user registered in the communication service provider operating center 50 or according to each identifier of an originating mobile terminal, and stored in the picture service controller 40.

Accordingly, in the present invention, if the identifier of an originating mobile terminal is different from the identifier of a terminating mobile terminal, i.e. if the originating mobile terminal is different from the terminating terminal, a caller information is provided to the terminating mobile terminal where the caller information may be one or a combination of the picture information, character information, and audio information. If the identifier of the originating mobile terminal is the same as the terminating mobile terminal, i.e. if a user pages his/her own mobile terminal, a user information is provided to the user's own mobile terminal where the user information may be one or a combination the picture information, character information, and audio information. In the latter case, the user can receive information meant only for the user himself/herself.

Figure 5:
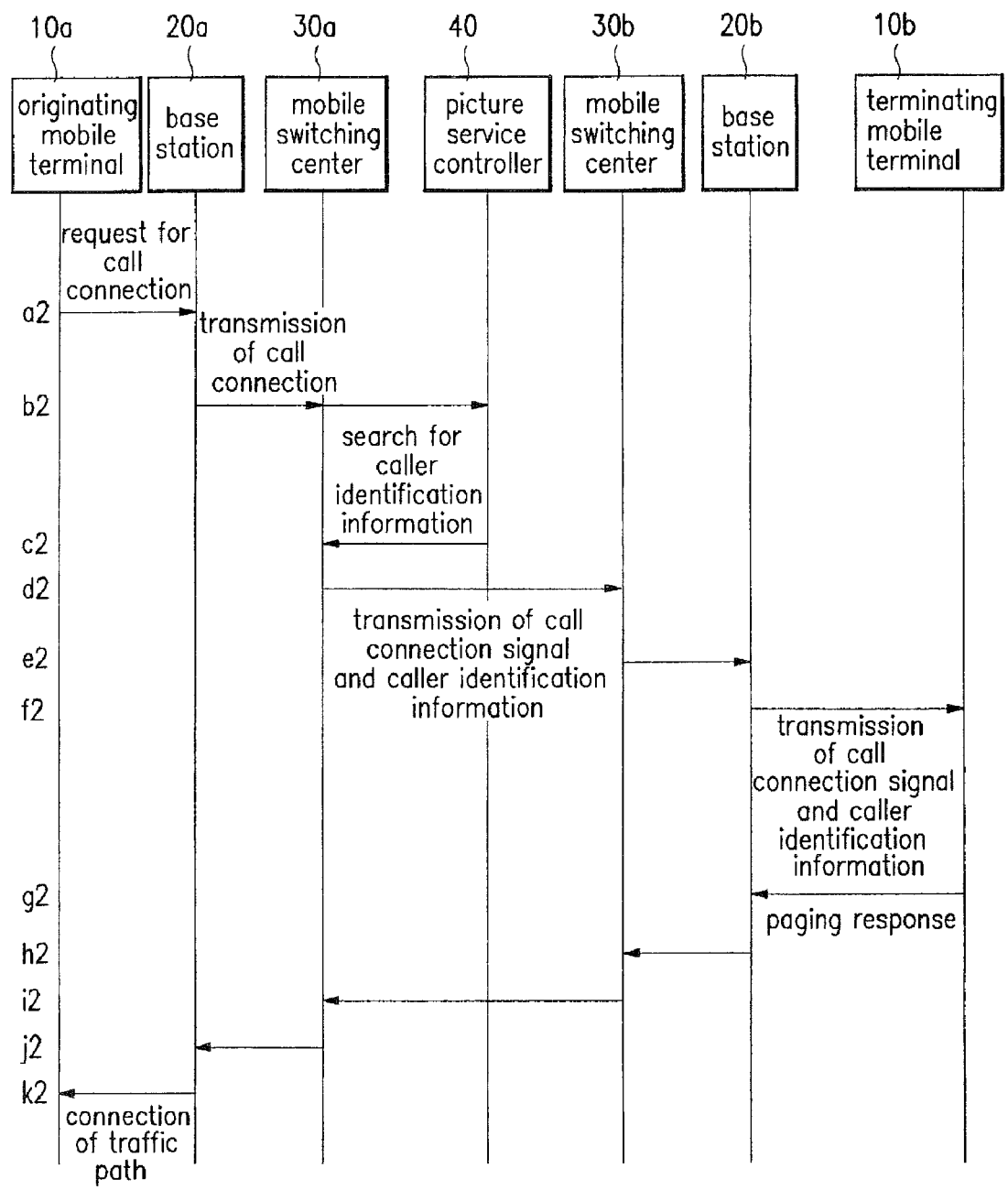
FIG. 5 is a flowchart of the caller identifying process in the CDMA mobile radio communication network according to the present invention.

Here, user can transmit a caller information to a terminating mobile terminal, including his/her own mobile terminal, using either the user's mobile terminal or using a computer and network. The present invention will be explained for an embodiment in which a caller information is transmitted through a mobile terminal. Referring to FIG. 5, assume that in a caller information transmitting process through a mobile terminal, all types of data including paging signal, audio signal, character signal, and picture signal may be transmitted.

As shown in FIG. 5, an originating mobile terminal 10a requests a call connection to a base station 20a (step a2). The base station 20a receives the call request signal from the originating mobile terminal 10a and transmits the call request signal to a mobile switching center 30a. Accordingly, the mobile switching center 30a obtains the location of the terminating mobile terminal 10b through the location register and requests a search for the caller identification information of the originating mobile terminal 10a to the picture service controller 40 (step b2).

The picture service controller 40 performs a search for the caller identification information and determines if a picture information, a character information, or a audio information corresponding to the originating mobile terminal 10a exists. The picture service controller 40 also determines which information should be combined and transmitted, thereby selectively combining and transmitting to the mobile switching center 30a the selected information as the caller information (step c2). The mobile switching center 30a transmits the caller identification information and paging signal to a mobile switching center which controls a terminating mobile terminal 10b (step d2), such that the caller identification information and the paging signal are transmitted to the terminating mobile terminal 10b (steps e2 and f2).

Figure 6:
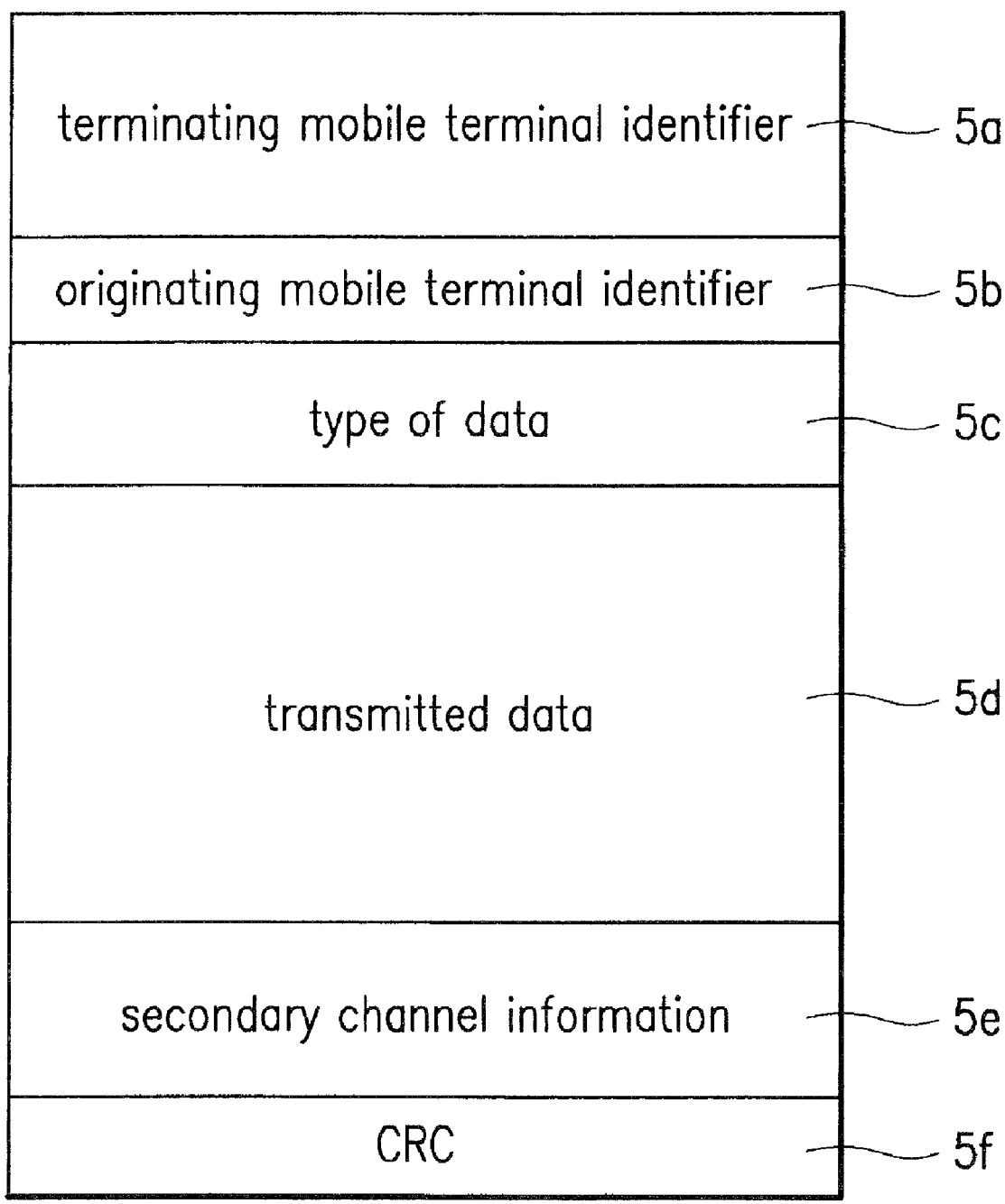
FIG. 6 illustrates the data frame structure of a paging signal or audio information according to the present invention.
Figure 7:
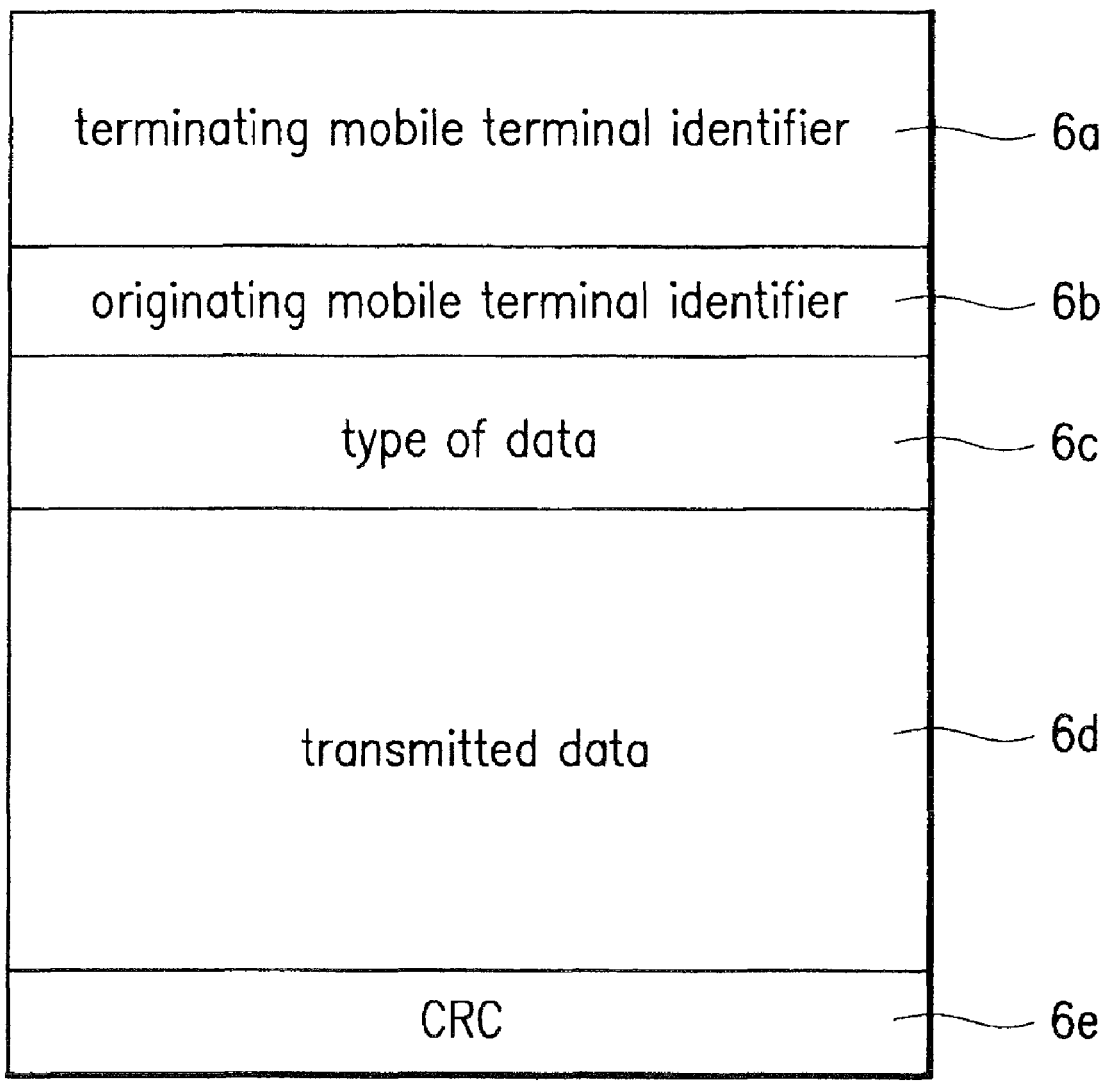
FIG. 7 illustrates the data frame structure of a character information or a picture information according to the present invention.

At this time, a base station 20b may transmit data such as the paging signal, audio information, character information, and picture information through a paging channel or traffic channel. Also, in the preferred embodiment, the base station 20b transmits to the termination mobile terminal 10b the paging signal and audio information with a data frame structure as shown in FIG. 6 through the main paging channel. In such case, the base station 20b would allocate the a predetermined secondary paging channel as the dedicated channel for the caller identification service, and transmit the character information and picture information with a data frame structure as shown in FIG. 7 through the dedicated channel.

When the picture information or character information is transmitted together with the audio information using two channels, the base station 20b informs whether the picture information or character information exists in the secondary channel information field 5e of the message transmitted through the main paging channel. Two paging channels may increase the efficiency of data transmission and reduce the load of the main paging channel since the character information and audio information have different transmission rates.

Although the terminating mobile terminal 10b in FIG. 5 is illustrated to belong in a control area of a mobile switching center 30b different from the mobile switching center 30a, the terminating mobile terminal 10b may also belong to the mobile switching center 30a.

In the present invention, a terminating mobile terminal 10b continuously checks during an allocated slot of time in each paging period whether a terminating signal for the terminating mobile terminal 10b is being transmitted. Here, the slot time allocated to the terminating mobile terminal 10b in the paging channel may be 80 msec for a paging period of 5.12 sec. If an input frame contains an identifier of the terminating mobile terminal, the caller identifier detecting unit 2 of FIG. 2 detects a corresponding data from the input frame.

From the detected data, the caller identifier detecting unit 2 identifies the terminating and originating mobile terminal identifiers 5a and 5b shown in FIG. 6, and determines the type of transmitted data through the data type field 5c. The transmitted data may be a paging signal, e.g. ring signal, a audio data, or both a paging signal and audio data. Also, secondary channel information field 5e includes a message informing whether a picture information or character information has been transmitted through a predetermined secondary channel. Accordingly, if the caller identifier detecting unit 2 determines that a picture information and/or character information has been transmitted, the terminating mobile terminal 10b receives the picture information or character information by moving to the secondary paging channel, and thereafter returns back to the main paging channel.

The caller identifier detecting unit 2 next determines whether the transmitted data is an audio information, character information, or picture information. If the data is an audio information, the audio information is transmitted to the audio information processing unit 4 for processing and then transferred to the processor 7. If the data is a picture information and/or character information, the caller identifier detecting unit 2 respectively transfers the picture information and/or character information to the picture information processing unit 6 and character information processing unit 5. The character information processing unit 5 and picture information processing unit 6 restore the character information and picture information to the original character signal and picture signal of 200×200 bits, and transfers the restored information to the processor 7 (see S1 and S2 of FIG. 8).

The processor 7 appropriately controls one or a combination of the picture display unit 11, the LCD display unit 12, and the speaker 13 depending upon the caller identification information. For example, if the caller identification information corresponding to the originating mobile terminal 10a represents that a picture information, character information, and audio information exist, the processor 7 controls the picture display unit 11 to display the picture information, controls the LCD display unit 12 to display the character information, and controls the speaker 13 to play the contents of the character information.

The picture information displayed on the picture processing unit 11 may be processed in two ways. First, if the transmitted picture information is determined to have a specific size (for example, 64×64 bits) in the system, the processor 7 displays the picture information from the picture information processing unit 6 as is. Second, if the transmitted picture information is a compressed picture of originally 200×200 bits, the processor 7 converts the resolution of the transmitted picture signal through the picture size converting unit 10 such that the size of the picture information from the picture information processing unit 6 matches the size of the picture display unit 11 of the mobile terminal.

Figure 8:
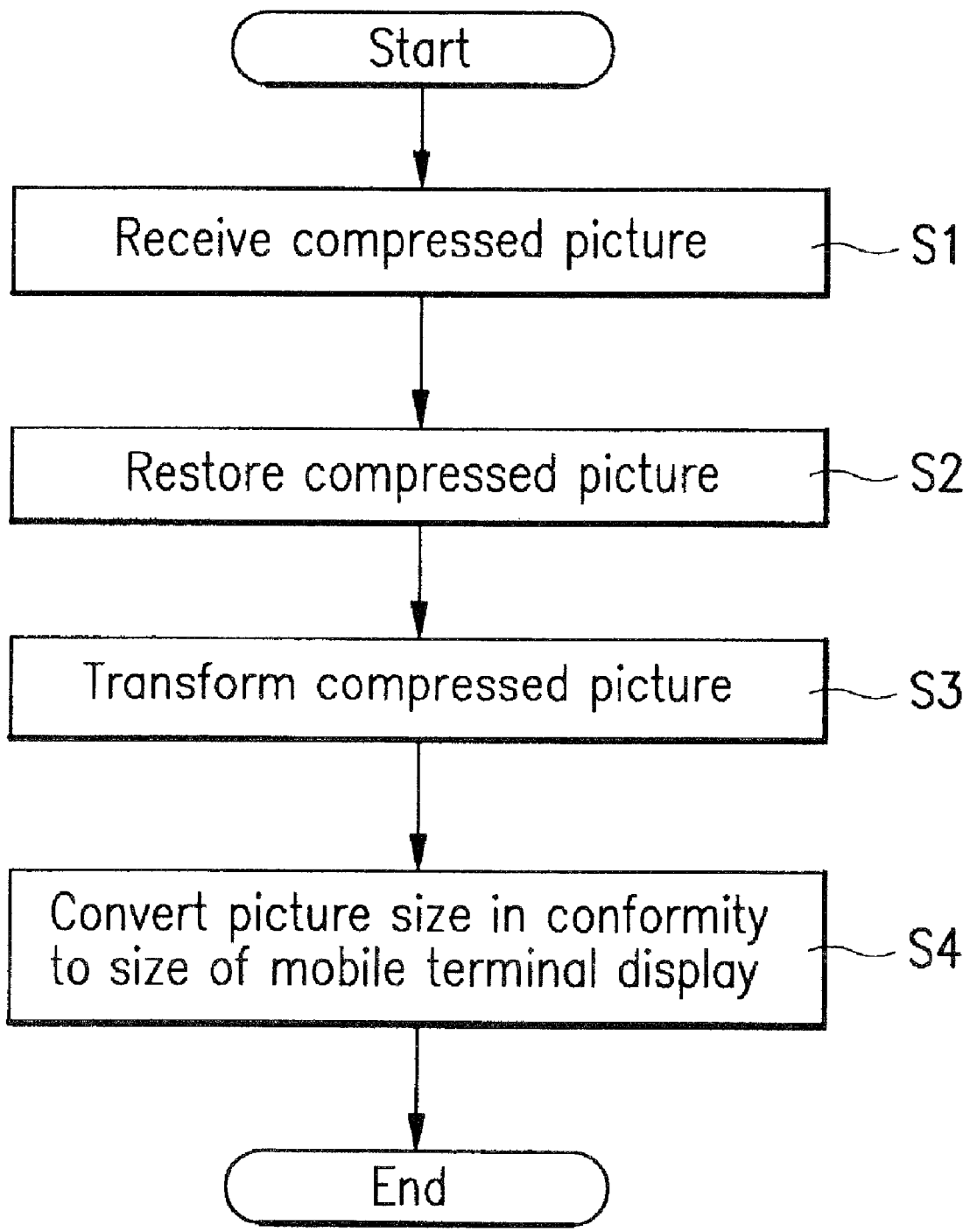
FIG. 8 is a flowchart of the process for converting a received picture signal in conformity of a display device in a mobile terminal according to the present invention.

FIG. 8 shows the second conversion process in which a compressed picture is received (step S1) and restored to the original picture of 200×200 bits (step S2). The restored original picture of 200×200 bits is then transformed into a picture of 256×256 bits using a horizontal interpolation or vertical interpolation (step S3). Thereafter, the processor 7 either reduces the resolution of the transformed picture information of 256×256 bits to 64×64 bits or 128×128 bits, or enlarges the transformed picture information. Although any method may be used to reduce or enlarge the resolution, the processor reduces the resolution by a pixel skipping or averaging technique and enlarges the resolution by a bi-linear interpolation or pixel duplicating technique. Namely, the resolution of the picture is converted in conformity to the size of the picture display unit 11 of the terminating mobile terminal 10b (step S4).

The picture information as converted above is stored in the memory 9 and displayed on the LCD display unit 12 under the control of the processor 7. According to the present invention, by displaying the picture information stored in the memory 9, a continuous display of the picture information can be maintained until a corresponding telephone call is completed.

Also, the processor 7 may provide an audio information through the speaker 13 after a terminating call signal, or directly output the audio information, omitting the terminating call signal.

Referring back to FIG. 5, if a user at the terminating mobile terminal 10b answers the telephone call after viewing the caller identification information, a pager-responding signal is transmitted from the terminating mobile terminal 10b to the corresponding mobile switching centers 30a and 30b, and a traffic path between the originating mobile terminal and the terminating mobile terminal 10b is determined (steps g2 to k2). Accordingly, the terminating mobile terminal 10b can be provided with one or a combination of the picture information, the character information, and the audio information as the caller identification information service requested through the communication service provider operating center 50. Namely, the terminating mobile terminal 10b can be provided with a picture information and audio information, a picture information and character information, or a picture information, character information, and audio information.

Therefore, according to the present invention, a terminating mobile terminal can be provided with a picture information of a caller, or caller information of one or a combination of a picture information, audio information, and character information, when the terminating mobile terminal receives a telephone call signal in a mobile radio communication network. For example, the terminating mobile terminal can be provided with only a picture information for displaying a face of the caller; both a picture information and character information; or a picture information, character information, and audio information simultaneously. Because a caller information is provided, a terminating mobile terminal user can recognize who is calling. Accordingly, the terminating mobile terminal user can decide whether to answer the telephone call, and during the telephone call, the terminating mobile terminal user can view a picture of the caller. Finally, in the event that a user pages his/her own mobile terminal, the user can receive a picture information, character information, and/or audio information registered by the user through his/her own mobile terminal.

The foregoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. An information processing apparatus comprising:
    a storage area to pre-store a plurality of caller identifiers and caller information corresponding to the caller identifiers, respectively, wherein the caller information includes picture information and wherein the picture information is pre-compressed based on a predetermined compression ratio;
    a data receiver to receive a call signal from a first mobile terminal linked to a first communication network;
    a caller identifier detector to detect a caller identifier of the first mobile terminal from the received call signal;
    a controller to extract caller information including picture information corresponding to the detected caller identifier from the storage area and to generate data type information indicative of a data type of the extracted caller information; and
    a data transmitter to transmit the extracted caller information and the data type information to a second mobile terminal through the first communication network or a second communication network different from the first communication network, the second mobile terminal restoring the caller information based on the data type information.

2. The information processing apparatus of claim 1, wherein the caller information also includes at least one of character information or audio information associated with the first mobile terminal.

3. The information processing apparatus of claim 1, wherein the picture information represents a user of the first mobile terminal.

4. The information processing apparatus of claim 3, wherein the picture information is pre-stored in the storage area using an external input device or a camera.

5. The information processing apparatus of claim 1, wherein the picture information is selected by and received from a user of the first mobile terminal.

6. The information processing apparatus of claim 5, wherein the picture information is pre-stored in the storage area using an external input device or a camera.

7. The information processing apparatus of claim 1, further comprising an identifier manager to manage the pre-stored caller identifiers in a database under control of the controller.

8. The information processing apparatus of claim 1, wherein the caller information is classified and pre-stored in the storage area according to each caller under control of the controller.

9. The information processing apparatus of claim 1, wherein the controller is adapted to output the detected caller identifier of the first mobile terminal.

10. The information processing apparatus of claim 9, wherein the data transmitter is adapted to transmit the detected caller identifier of the first mobile terminal through the first or second communication network.

11. The information processing apparatus of claim 1, further comprising a caller information processor to process the caller information outputted from the storage unit and to output the processed caller information to the data transmitter.

12. An information processing method comprising:
pre-storing a plurality of caller identifiers and caller information corresponding to the caller identifiers, respectively, in a memory, wherein the caller information includes picture information and wherein the picture information is pre-compressed based on a predetermined compression ratio;
receiving a call signal from a first mobile terminal linked to a first communication network;
detecting a caller identifier of the first mobile terminal from the received call signal;
extracting caller information which includes picture information corresponding to the detected caller identifier from the memory;
generating data type information indicative of a data type of the extracted caller information; and
transmitting the extracted caller information and the data type information to a second mobile terminal, the transmitted caller information being restored by the second mobile terminal based on the transmitted data type information.

13. The information processing method of claim 12, wherein the caller information includes at least one of character information or audio information associated with the first mobile terminal.

14. The information processing method of claim 12, further comprising outputting the detected caller identifier of the first mobile terminal through the first or a second communication network.

15. The information processing method of claim 14, wherein the second communication network is a wireless communication network.

16. The information processing method of claim 12, further comprising processing the caller information outputted from the memory.

17. The information processing method of claim 12, wherein the picture information represents a user of the first mobile terminal.

18. The information processing method of claim 17, wherein the picture information is pre-stored in the storage unit using an external input device or a camera.

19. The information processing method of claim 12, wherein the picture information is selected by and received from a user of the first mobile terminal.

20. The information processing method of claim 19, wherein the picture information is pre-stored in the storage unit using an external input device or a camera.

21. A digital network system comprising:
a first mobile terminal adapted to transmit a call signal including a caller identifier of the first mobile terminal;
an information processing terminal linked to the first mobile terminal through a first mobile communication network, wherein the information processing terminal comprises:
a storage area to pre-store a plurality of caller identifiers and caller information corresponding to the caller identifiers, respectively, wherein the caller information includes picture information and wherein the picture information is pre-compressed based on a predetermined compression ratio;
a data receiver to receive the call signal from the first mobile terminal;
a caller identifier detector to detect the caller identifier of the first mobile terminal from the received call signal;
a controller to extract caller information including picture information corresponding to the detected caller identifier from the storage area, and to generate data type information indicative of a data type of the extracted caller information; and
a data transmitter to transmit the extracted caller information and the data type information; and
a second mobile terminal linked to the information processing terminal through the first or a second mobile communication network different from the first communication network to receive the caller information and the data type information from the data transmitter, wherein the second mobile terminal restores the caller information based on the data type information.

22. The digital network system of claim 21, wherein the caller information includes at least one of character information or audio information associated with the first mobile terminal.

23. The digital network system of claim 21, wherein the picture information represents a user of the first mobile terminal.

24. The digital network system of claim 23, wherein the picture information is pre-stored in the storage area using an external input device or a camera.

25. An information processing apparatus comprising:
a data receiver to receive a caller identifier of a first mobile terminal and caller information associated with the first mobile terminal from a communication service provider, wherein the caller information includes picture information and wherein the picture information is pre-compressed based on a predetermined compression ratio;
a caller identifier detector to detect the caller identifier of the first mobile terminal;
a storage area to store the detected caller identifier and caller information including the pre-compressed picture information;
a controller to control operation of the storage unit and to extract the stored caller information from the storage unit and generate data type information indicative of a data type of the extracted caller information when the first mobile terminal initiates a call to a second mobile terminal; and
a data transmitter to transmit the extracted caller information and the data type information to the second mobile terminal under control of the controller, the second mobile terminal restoring the caller information based on the data type information.

26. The information processing apparatus of claim 25, wherein the caller information includes at least one of character information or audio information associated with the first mobile terminal.

27. The information processing apparatus of claim 25, further comprising a caller information processor to process the caller information stored in the storage area and to output the processed caller information to the data transmitter.

28. The information processing apparatus of claim 25, wherein the caller information associated with the detected caller identifier is included in the data received from the first mobile terminal.

29. The information processing apparatus of claim 25, wherein the picture information represents a user of the first mobile terminal.

30. The information processing apparatus of claim 29, wherein the picture information is stored in the storage area using an external input device or a camera.

31. The information processing apparatus of claim 25, wherein the picture information is selected by and received from a user of the first mobile terminal.

32. The information processing apparatus of claim 31, wherein the picture information is stored in the storage area using an external input device a camera.

33. An information processing method comprising:
 receiving a caller identifier of a first mobile terminal and caller information associated with the first mobile terminal from a communication service provider, wherein the caller information includes picture information and wherein the picture information is pre-compressed based on a predetermined compression ratio;
 detecting the caller identifier of the first mobile terminal;
 storing the detected caller identifier and caller information including the pre-compressed picture information;
 extracting the stored caller information;
 generating data type information indicative of a data type of the extracted caller information when the first mobile terminal initiates a call to a second mobile terminal; and
 transmitting the extracted caller information and the data type information to the second mobile terminal, wherein the second mobile terminal restores the caller information based on the data type information.

* * * * *